(12) United States Patent
Miyagawa

(10) Patent No.: US 8,056,042 B2
(45) Date of Patent: Nov. 8, 2011

(54) AUTOMATIC DELAY ADJUSTING METHOD FOR SEMICONDUCTOR INTEGRATED CIRCUIT BY USING DUMMY WIRING

(75) Inventor: Seiji Miyagawa, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 596 days.

(21) Appl. No.: 12/213,372

(22) Filed: Jun. 18, 2008

(65) Prior Publication Data
US 2009/0007041 A1 Jan. 1, 2009

(30) Foreign Application Priority Data

Jun. 26, 2007 (JP) ................................. 2007-168218

(51) Int. Cl.
*G06F 17/50* (2006.01)
(52) U.S. Cl. ......... 716/129; 716/113; 716/130; 716/134
(58) Field of Classification Search .................. None
See application file for complete search history.

(56) References Cited

U.S. PATENT DOCUMENTS

| | | | |
|---|---|---|---|
| 6,209,121 B1 * | 3/2001 | Goto ............................ | 716/113 |
| 6,637,014 B2 * | 10/2003 | Casavant ...................... | 716/114 |
| 6,951,007 B2 * | 9/2005 | Kaida .......................... | 716/113 |
| 7,039,890 B2 | 5/2006 | Takechi et al. | |
| 7,069,528 B2 * | 6/2006 | Kovacs et al. ................ | 716/113 |
| 7,191,416 B2 * | 3/2007 | Hulbert et al. ............... | 716/114 |
| 7,200,831 B2 * | 4/2007 | Kitabayashi .................. | 716/129 |
| 7,278,126 B2 * | 10/2007 | Sun et al. ...................... | 716/114 |
| 7,392,496 B1 * | 6/2008 | Schultz et al. ................ | 716/113 |
| 7,735,043 B2 * | 6/2010 | Ueda ............................. | 716/126 |
| 2005/0110130 A1 * | 5/2005 | Kitabayashi et al. ......... | 257/698 |
| 2006/0168551 A1 * | 7/2006 | Mukuno ......................... | 716/5 |
| 2007/0272949 A1 * | 11/2007 | Shinomiya et al. ........... | 257/208 |

FOREIGN PATENT DOCUMENTS

| | | |
|---|---|---|
| JP | 2003-273221 | 9/2003 |
| JP | 2005-86153 | 3/2005 |

* cited by examiner

*Primary Examiner* — Leig Garbowski
(74) *Attorney, Agent, or Firm* — McGinn IP Law Group, PLLC

(57) ABSTRACT

An automatic delay adjusting method of a semiconductor integrated circuit includes placing a dummy wiring to a layout data and connecting the dummy wiring to a target wiring between a first cell and a second cell which is a timing violation occurs for the target wiring in the layout data. The dummy wiring connection includes replacing the dummy wiring with a dummy wiring cell having first and second pins corresponding to both ends of the dummy wiring, cutting the target wiring to generate first and second target wirings, connecting the first and second target wirings to the first and second pins, respectively, and replacing the dummy wiring cell with the dummy wiring to provide a wiring that is connected with the dummy wiring to the cut target wiring.

20 Claims, 18 Drawing Sheets

Fig. 2

21 LAYOUT INFORMATION FILE

| NAME | COORDINATES (X,Y) |
|---|---|
| CELL 30-1 | |
| CELL 30-2 | |
| ⋮ | ⋮ |
| CELL 30-M | |
| ⋮ | ⋮ |
| WIRING 40 | |
| WIRING ○○ | |
| ⋮ | ⋮ |
| WIRING △△ | |
| ⋮ | ⋮ |
| DUMMY WIRING 50-1 | |
| DUMMY WIRING 50-2 | |
| ⋮ | ⋮ |
| DUMMY WIRING 50-N | |
| ⋮ | ⋮ |

Fig. 3

22 DELAY INFORMATION FILE

| COORDINATES (X,Y) | DELAY TIME [ ps ] |
|---|---|
| | |
| | |
| ⋮ | ⋮ |
| | |

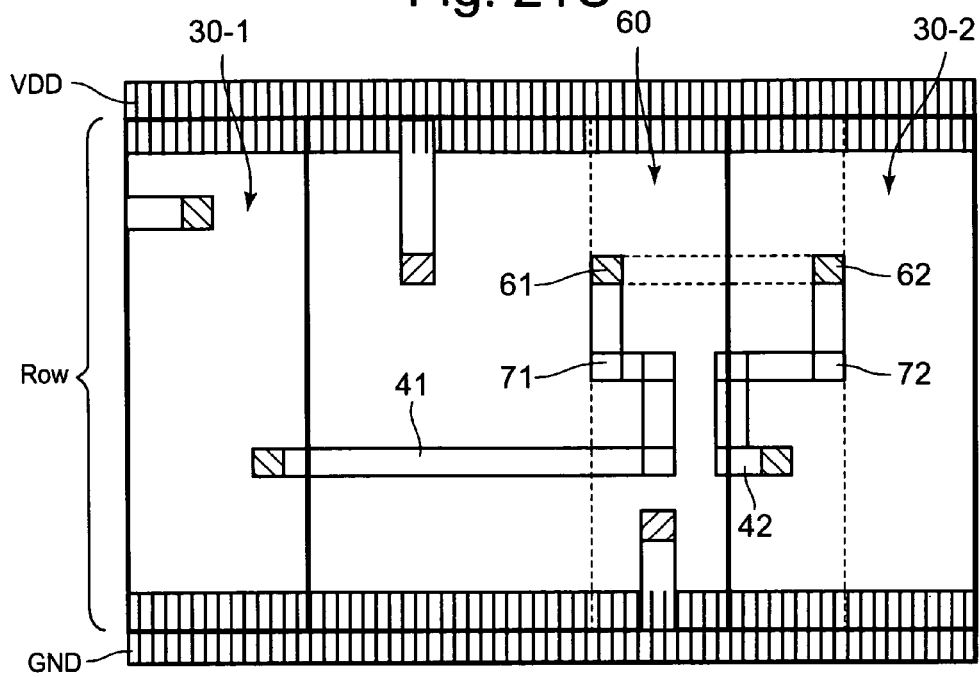
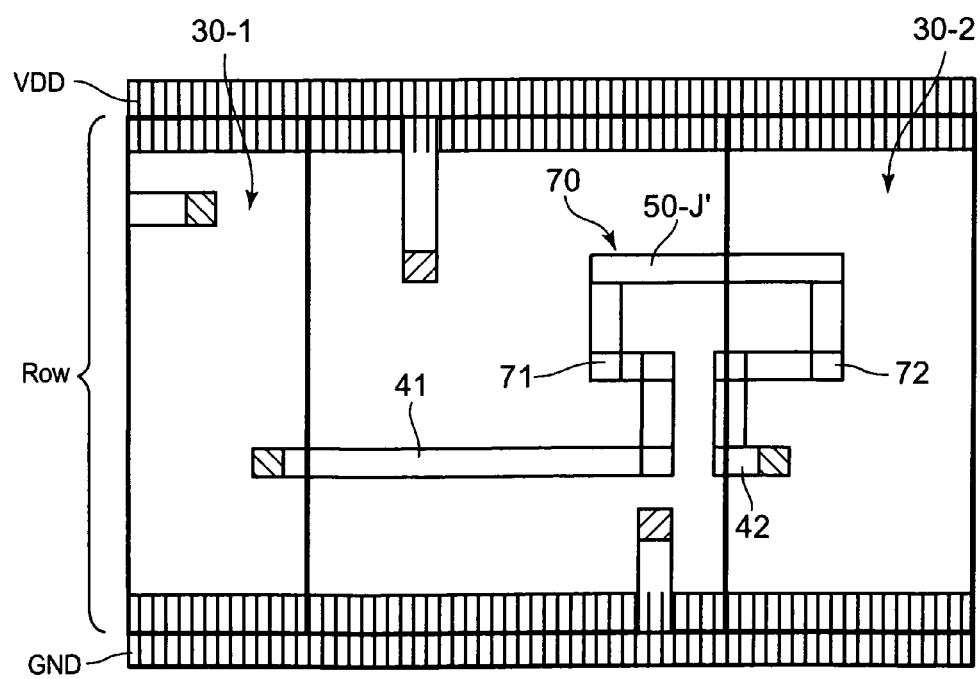

AUTOMATIC DELAY ADJUSTING METHOD FOR SEMICONDUCTOR INTEGRATED CIRCUIT BY USING DUMMY WIRING

BACKGROUND OF THE INVENTION

1. Field of the Invention

The present invention relates to a delay adjusting method, computer program, and a computer for adjusting a delay of a semiconductor integrated circuit.

2. Description of Related Art

There has been developed a technique such as a tool (computer program) for adjusting a delay of a semiconductor integrated circuit, or a computer in which the tool has been installed. As the technique, a timing adjustment is conducted when a timing violation occurs for the target wiring with respect to layout data where a first cell and a second cell which operate by clocks, and a target wiring that is connected between the first cell and the second cell are placed out in a coordinate area.

As a technique related to the above technique, for example, Japanese Patent Laid Open Application No. 2005-86153 discloses a technique of connecting a dummy wiring to a target wiring by manual for the purpose of reducing the man-hours of the timing adjustment. More specifically, there is manually conducted a rewiring process in a route so as to determine a course that connects the dummy wiring to the target wiring, cut the target wiring, and connect the dummy wiring to the target wiring.

Japanese Patent Laid Open Application No. 2003-273221 discloses a technique of adjusting a distance (interval) between the target wiring and the dummy wiring for the purpose of shortening a turn around time of the layout process. More specifically, the dummy wiring around the target wiring for which a timing violation occurs is deleted, or set as a wiring prohibition area.

In recent years, it is desirable to automatically conduct the timing adjustment so as to easily leave wiring with anybody.

However, in the technique disclosed in JP2005-086153, a process of connecting the dummy wiring to the target wiring is conducted manually. For that reason, there is no versatility, and man-hours and time are required when a person other than the skilled man conducts the above process.

In the technique disclosed in JP2003-273221, the dummy wiring around the target wiring is deleted, or set as the wiring prohibition area. For that reason, in the area where the dummy wiring has been removed, the wiring density gets short, or the wiring density cannot be uniformed. Accordingly, it is necessary to conduct the timing adjustment by the aid of the dummy wiring.

SUMMARY OF THE INVENTION

According to an exemplary aspect of the present invention, an automatic delay adjusting method of a semiconductor integrated circuit includes placing a dummy wiring to a layout data and connecting the dummy wiring to a target wiring between a first cell and a second cell for which a timing violation occurs in the layout data. The dummy wiring connection step includes, replacing the dummy wiring with a dummy wiring cell having first and second pins corresponding to both ends of the dummy wiring, cutting the target wiring to generate first and second target wirings, connecting the first and second target wirings to the first and second pins, respectively, and replacing the dummy wiring cell with the dummy wiring to provide a wiring that is connected with the dummy wiring to the cut target wiring.

With the above configuration, according to the automatic delay adjusting method for a semiconductor integrated circuit of the present invention, when a timing violation occurs for the target wiring, it is possible to automatically connect the dummy wiring to the target wiring.

As its reason, in the exemplary automatic delay adjusting method for the semiconductor integrated circuit according to the present invention, the dummy wiring is replaced with a dummy wiring cell having first and second pins corresponding to both ends of the dummy wiring, the target wiring is cut to generate first and second target wirings having one ends connected to the first and second cells, respectively, and another ends of the first and second target wirings are connected to the first and second pins of the dummy wiring cell. Then, the dummy wiring cell is replaced with the dummy wiring to generate a wiring to be modified including a first target wiring, a dummy wiring, and a second target wiring. In this way, in the automatic delay adjusting method for a semiconductor integrated circuit according to the present invention, when the timing violation occurs for the target wiring, the dummy wiring is automatically connected to the target wiring, thereby making it possible to reduce the manpower and a time required for the manpower as compared with a case of connecting the dummy wiring to the target wiring by manual. Accordingly, the automatic delay adjusting method for a semiconductor integrated circuit according to the present invention is excellent in the versatility as compared with the manual method.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIG. 2 shows a placement information file 21;

FIG. 3 shows a delay information file 22;

FIG. 21C is a layout diagram corresponding to FIGS. 12 to 16, and FIG. 21D is a layout diagram corresponding to FIG. 17.

DETAILED DESCRIPTION OF THE EXEMPLARY EMBODIMENTS

First Embodiment

Figure 1:
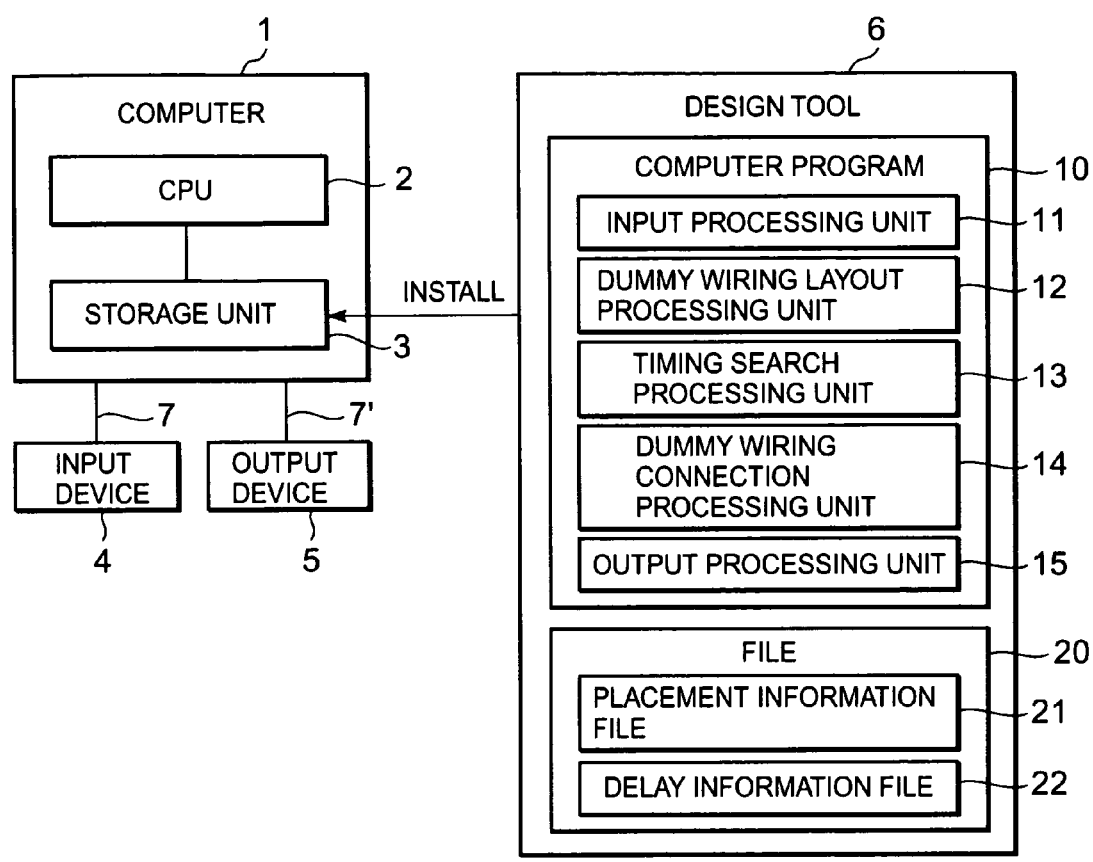
FIG. 1 shows an exemplary configuration of a design system to which an automatic delay adjusting method for a semiconductor integrated circuit according to the present invention is applied.

FIG. 1 shows the exemplary configuration of a design system to which an automatic delay adjusting method for a semiconductor integrated circuit according to the present invention is applied. Such a system includes a computer 1, an input device 4 and an output device 5. The input device 4 and the output device 5 are connected to the computer 1. The output device 5 contains a display apparatus and a printer.

A computer 1 includes a storage unit 3 that stores a computer program therein, and a CPU (central processing unit) 2 that is an execution unit that executes the computer program.

The design system also includes a design tool 6 that is software. The design tool 6 is installed in the storage unit 3. The design tool 6 includes a computer program 10 and a file 20. The file 20 includes a placement information file 21 and a delay information file 22.

FIG. 2 shows a placement information file 21. The placement information file 21 has a given coordinate area (X, Y) in which parts for constituting the semiconductor integrated circuit are placed. Names that discriminate the parts and the coordinates (X, Y) when the parts are placed in a given coordinate area are stored in the placement information file 21 by the computer program 10. Cells, wirings, and dummy wirings are exemplified as the parts.

FIG. 3 shows a delay information file 22. The coordinates when a clock or a signal (for example, a data signal transmitting on a data line) is transmitted from one part to another part, and a delay time at that time are stored in the delay information file 22 by the computer program 10. For example, when first, second, and third parts are a first cell, a wiring, and a second cell, respectively, the coordinates when the clock or the signal is transmitted from the first cell to the second cell through the wiring corresponds to the wiring length of the above wiring.

The computer program 10 includes an input processing unit 11, a dummy wiring placement processing unit 12, a timing search processing unit 13, a dummy wiring connection processing unit 14, and an output processing unit 15, which will be described later.

Figure 4:
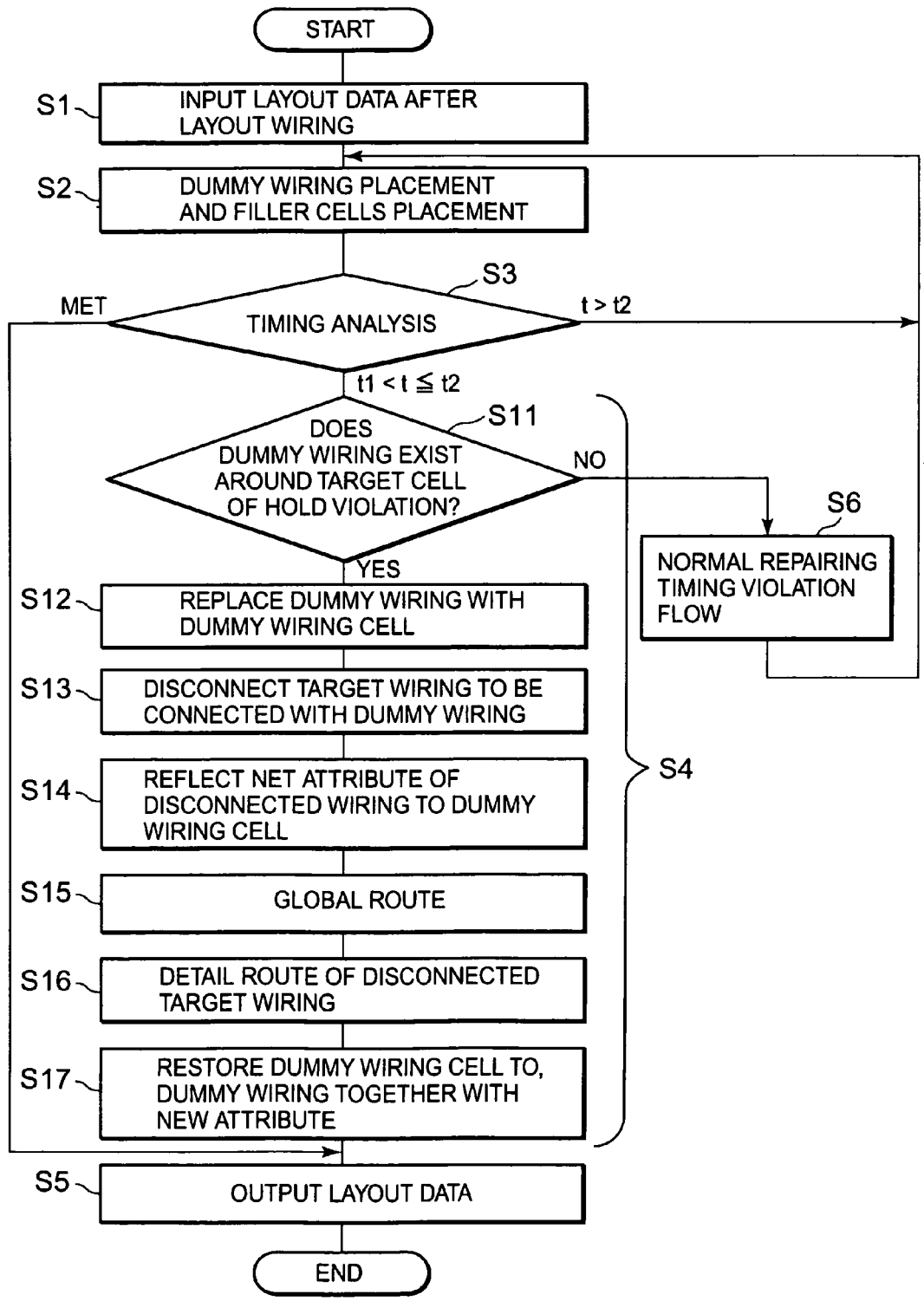
FIG. 4 is a flowchart showing the operation of a computer 1, which shows an automatic delay adjusting method for a semiconductor integrated circuit according to a first embodiment of the present invention.

FIG. 4 is a flowchart showing an operation of the computer 1, which shows an automatic delay adjusting method for a semiconductor integrated circuit according to a first embodiment of the present invention.

Figure 5:
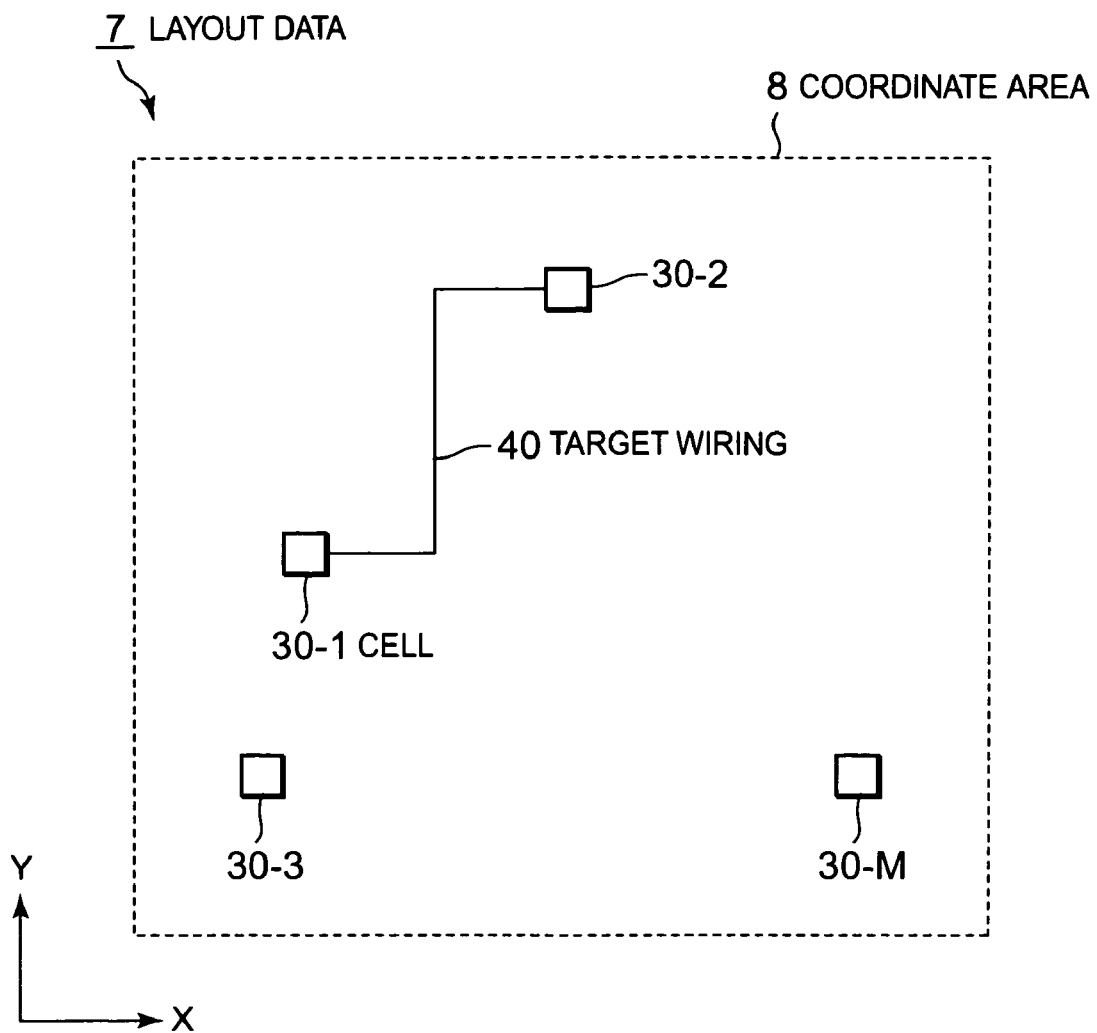
FIG. 5 is a diagram to explain the processing of Step S1 in FIG. 4, which is layout data 7.

The input processing unit 11 inputs layout data 7 (step S1). As shown in FIG. 5, the layout data 7 has a given coordinate area 8 representative of the coordinates (X, Y). Plural cells 30-1 to 30-M (M is an integer of 2 or more), and plural wirings (not shown) are placed in the coordinate area 8. For example, the first cell is a cell 30-1 among plural cells 30-1 to 30-M, and the second cell is a cell 30-2 among plural cells 30-1 to 30-M. In this example, it is assumed that a wiring that is connected between the first cell 30-1 and the second cell 30-2 among the plural wirings is a target wiring 40. The input processing unit 11 stores the plural cells 30-1 to 30-M that are placed in the coordinate area 8, the names that identify the plural wirings, and the coordinates (X, Y) when these are placed in the coordinate area 8 in the placement information file 21. Also, the input processing unit 11 stores the respective wiring lengths and delay times of the plural wirings in the delay information file 22.

Figure 6:
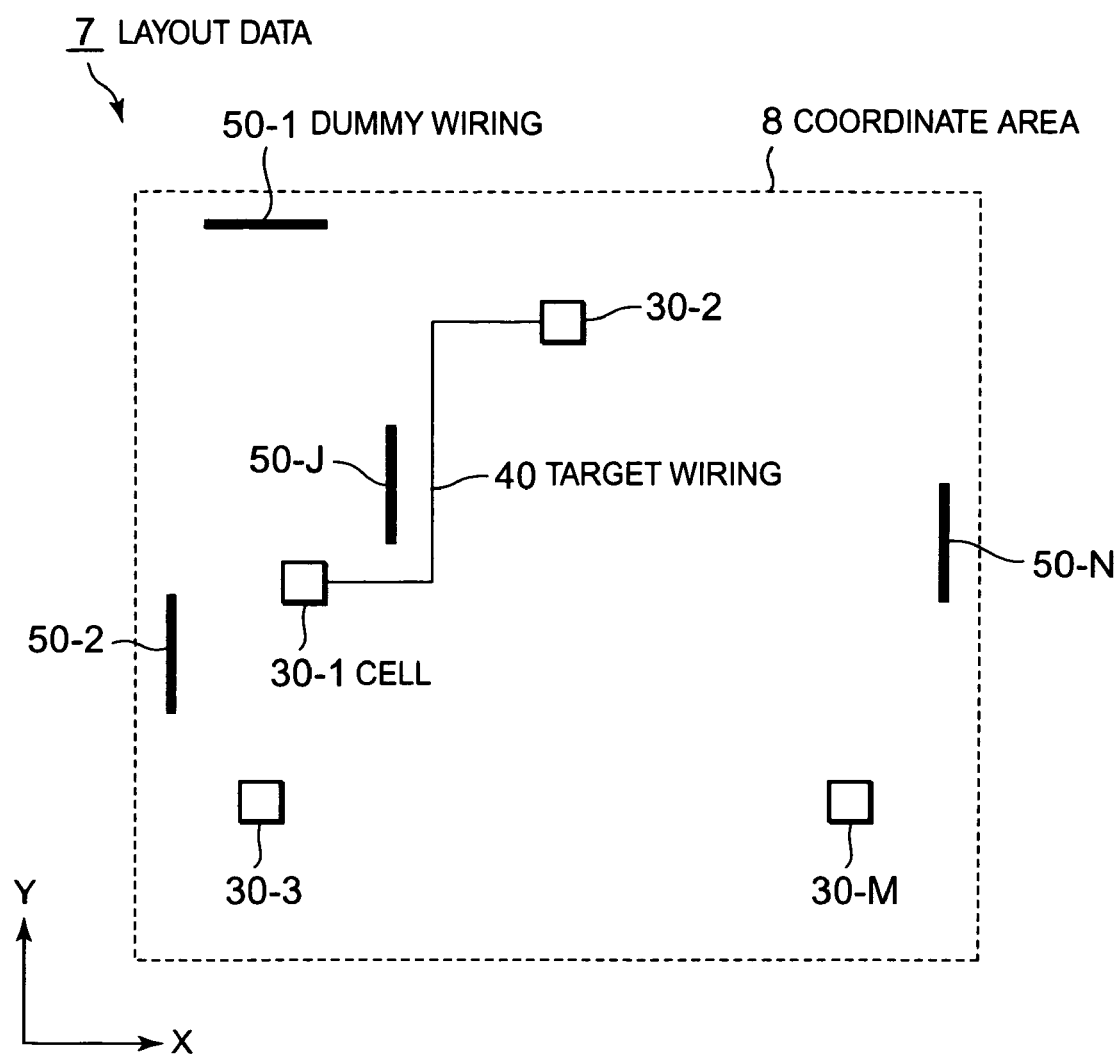
FIG. 6 is a diagram to explain the processing of Step S2 in FIG. 4, which is the layout data 7.

As shown in FIG. 6, the dummy wiring placement processing unit 12 places the plural dummy wirings 50-1 to 50-N (N is an integer of 2 or more) in the coordinate area 8 at random (Step S2). The plural dummy wirings 50-1 to 50-N are placed in the coordinate area 8 in order to hold the wiring density constant. The dummy wiring placement processing unit 12 stores the names that identify the plural dummy wirings 50-1 to 50-N that are placed in the coordinate area 8, and the coordinates (X, Y) when the names are placed in the coordinate area 8 in the placement information file 21. Also, the input processing unit 11 stores the respective wiring lengths and delay times of the plural dummy wirings 50-1 to 50-N in the delay information file 22.

The timing search processing unit 13 executes a timing search process that searches the wiring for which the timing violation occurs among the plural wirings (Step S3).

The timing search process (Step S3) will be described.

The timing search processing unit 13 calculates the respective delay times of the plural wirings with reference to the delay information file 22 that associates the wiring lengths with the delay times. In more details, the coordinates are defined about all vertexes (apex) of the wiring. The wiring length is defined as the length of the wiring in its length or long direction. The wiring length can be calculated based on the vertexes of the wiring. The delay time is defined as the delay value calculated per the wiring length. The delay value per the respective wiring length may be prepared as a library. Subsequently, the timing search processing unit 13 searches whether the delay time t of the target wiring 40 among the plural wirings is longer than first and second hold violation setting times, or not, when the delay time t represents the hold violation. In this example, when it is assumed that the first hold violation setting time is t1, t1=0 [ps] is set. Also, when the second hold violation setting time is longer than the first hold violation setting time t1, and the second hold violation setting time is set to t2, t2=20 (ps) is set.

Under the above circumstances, when the timing violation does not occur for each of the plural wirings (MET in Step S3), the timing search processing unit 13 outputs the above layout data 7 to the output device 5 as layout data 7' (Step S5).

On the other hand, as a first timing violation, the delay time t of the target wiring 40 is longer than the first hold violation setting time t1 and equal to or shorter than the second hold violation setting time t2 (t1<t≦t2 in Step S3). In this case, the dummy wiring connection processing unit 14 executes a dummy wiring connection processing that connects a dummy wiring 50-J (J is an integer that satisfies 1≦J≦N) which will be described later to the target wiring 40 (Step S4).

In the dummy wiring connection processing, the dummy wiring 50-J for holding the wiring density constant is effectively used as timing adjustment.

As a second timing violation, the delay time t of the target wiring 40 exceeds a second hold violation setting time t2 (t>t2 in Step S3). In this case, the dummy wiring placement processing unit 12 places a hold buffer cell (not shown) for making the delay time longer than the dummy wiring 50-J on the target wiring 40 to generate a wiring connected to a hold buffer cell (not shown) (Steps S6 and S2). In this situation, the timing search processing unit 13 again executes the above timing search processing (Step S3) with the wiring connected to a hold buffer cell as the target wiring 40 (Step S3). When the timing search processing is again executed, the delay time t of the target wiring 40 is longer than the first hold violation setting time t1, and equal to or shorter than the second hold violation setting time t2 (t1<t≦t2 in Step S3). Similarly, in this case, the dummy wiring connection processing unit 14 executes a dummy wiring connection processing that will be described later (Step S4).

The dummy wiring connection processing (Step S4) will be described.

Figure 7:
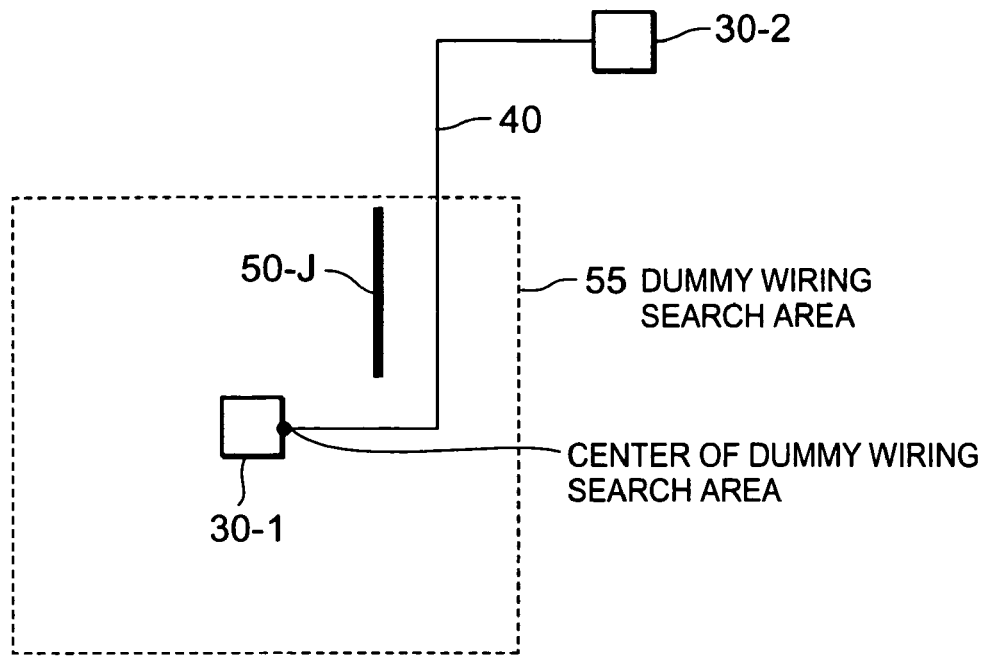
FIG. 7 is a diagram to explain the processing of Step S11 in FIG. 4, which is the layout data 7.
Figure 8:
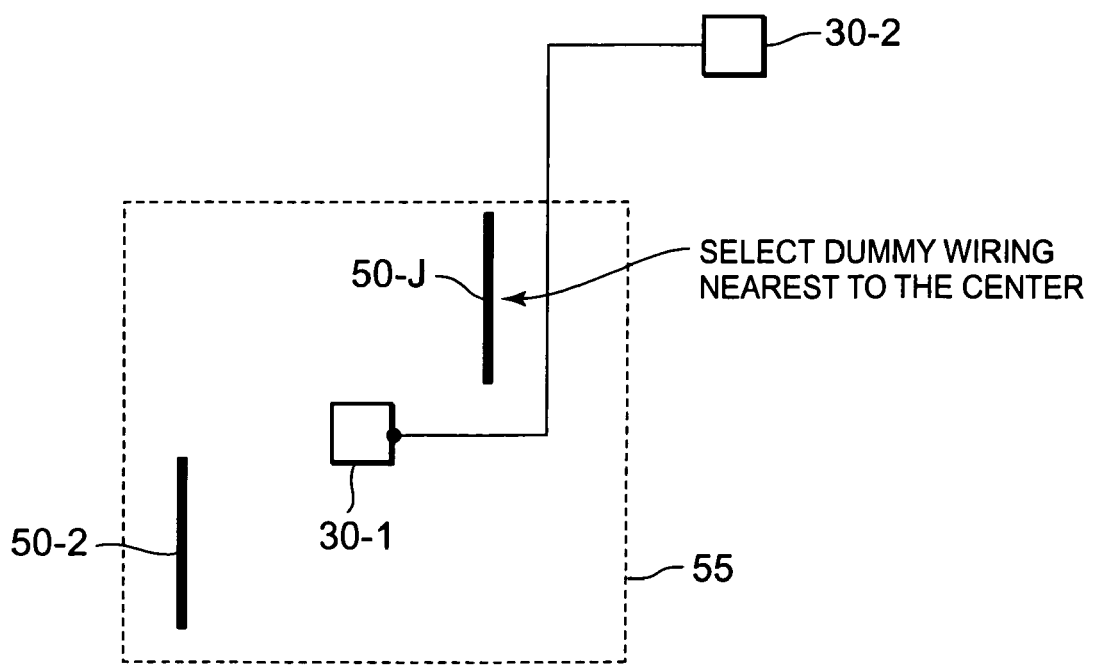
FIG. 8 is a diagram to explain the processing of Step S11 in FIG. 4, which is the layout data 7.

As shown in FIG. 7, the dummy wiring connection processing unit 14 determines a dummy wiring search area 55 as a given area smaller than the coordinate area 8 around the coordinates of an end (● in FIG. 7) of the target wiring 40 which is connected to the first cell 30-1 among the coordinates (X, Y) which is represented by the coordinate area 8. The dummy wiring connection processing unit 14 searches a dummy wiring that exists in the dummy wiring search area 55 among the plural dummy wirings 50-1 to 50-N as a dummy wiring 50-J (J is an integer that satisfies 1≦J≦N) (yes in Step S11). Also, as shown in FIG. 8, there is a case in which the plural dummy wirings (for example, dummy wirings 50-2 and 50-J) exist in the dummy wiring search area 55. In this case, the dummy wiring connection processing unit 14 searches the dummy wiring closest to the end of the target wiring 40 that is connected to the first cell 30-1 among the dummy wirings 50-2 and 50-J as the dummy wiring 50-J. That is, the dummy wiring connection processing unit 14 searches the dummy wiring closest to the target wiring 40 as the dummy wiring 50-J (yes in Step S11).

On other hand, when no dummy wiring exists in the dummy wiring search area 55, the dummy wiring placement processing unit 12 executes the above steps S6 and S2.

The dummy wiring connection processing unit 14 executes a cell replacement processing that replaces the dummy wiring 50-J with the dummy wiring cell 60 when the dummy wiring connection processing unit 14 searches the dummy wiring 50-J (Step S12).

The dummy wiring cell 60 is a virtual cell that is different from a normal cell having a transistor, has a configuration and a terminal which correspond to the dummy wiring 50-J, and can be overlapped with another cell. In the normal cell, the overlapping of the cells is not allowed. However, in the present invention, the dummy wiring cell 60 is overlapped with another cell (this will be described later, but refer to FIG. 21B). In the present invention, with the above structure, the dummy wiring 50-J can be freely placed without any limit of the cell placement.

The cell replacement processing (Step S12) will be described.

Figure 9A:
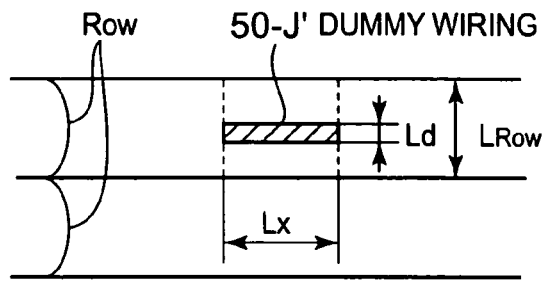
FIG. 9A is a diagram to explain the processing of Step S12 in FIG. 4, which is the layout data 7
Figure 9B:
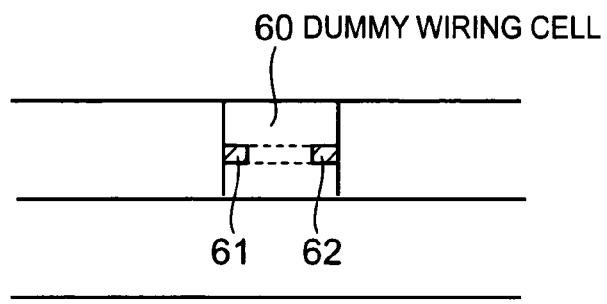
FIG. 9B is a diagram for explaining the processing of Step S12 in FIG. 4, which is the layout data 7.
Figure 21A:
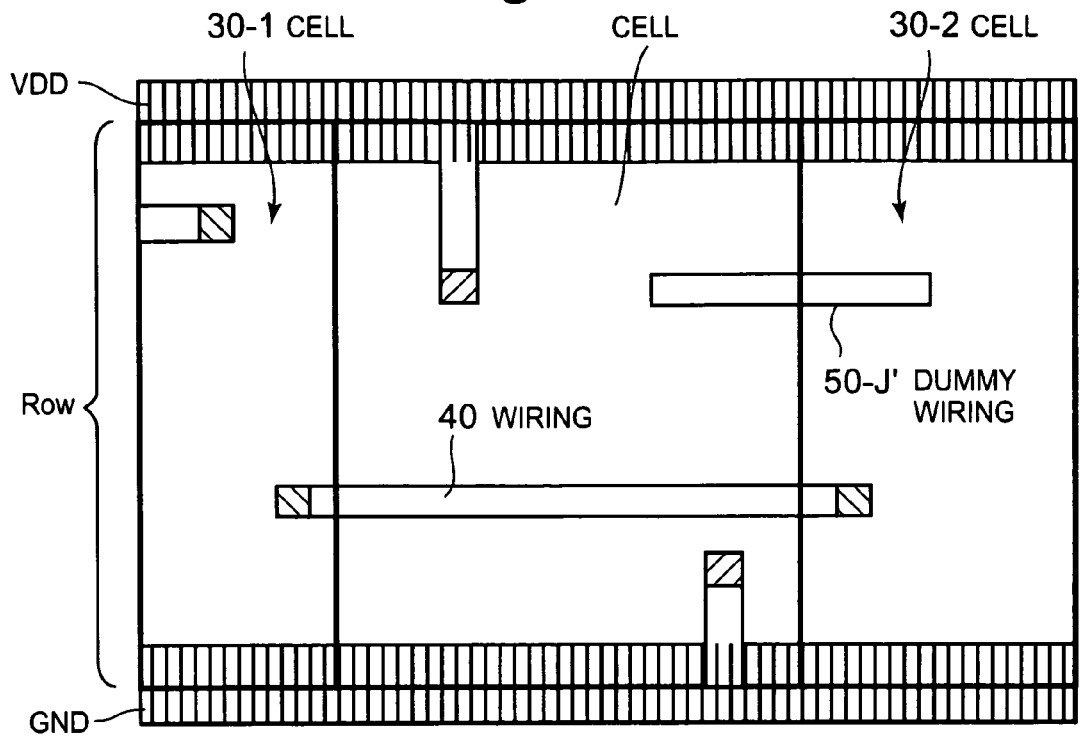
FIG. 21A is a layout diagram corresponding to FIG. 9A.
Figure 21B:
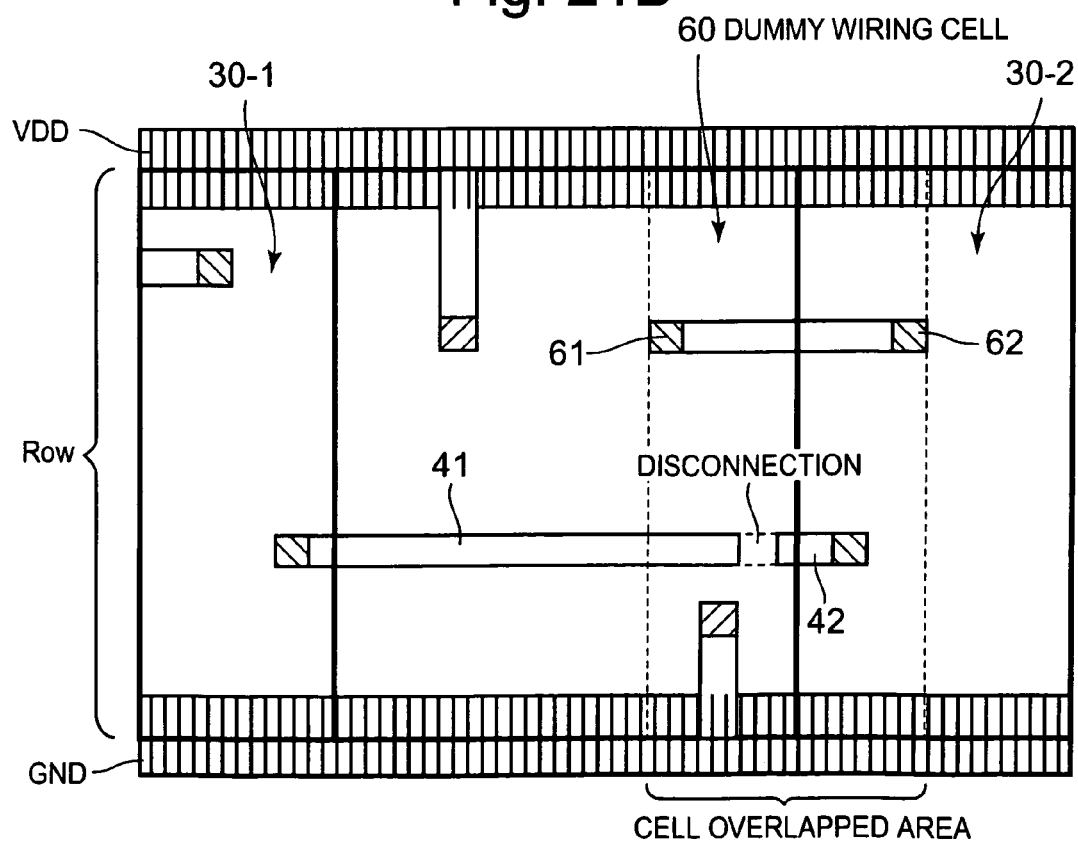
FIG. 21B is a layout diagram corresponding to FIG. 9B.

As shown in FIG. 9A, it is assumed that the dummy wiring 50-J extends in parallel to the x-direction of the coordinates (X, Y) represented by the coordinate area 8. Also, as shown in FIG. 21A, each of the plural cells 30-1 to 30-M is placed between a first power supply VDD and a second power supply GND. Under the circumstance, as shown in FIG. 9A, it is assumed that the dummy wiring 50-J is a dummy wiring 50-J', and a length extending from one end of the dummy wiring 50-J' to another end thereof is Lx. Also, it is assumed that a width of the dummy wiring 50-J' is Ld. The width Ld is remarkably shorter than a length $L_{ROW}$ of Row between the first power supply VDD and the second power supply GND. In this case, as shown in FIG. 9B, the dummy wiring connection processing unit 14 replaces the dummy wiring 50-J' with a dummy wiring cell 60 whose configuration is determined as the length Lx and the length LROW. For example, as shown in FIG. 21B, the dummy wiring cell 60 is placed between the first power supply VDD and the second power supply GND, and overlaps with the second cell 30-2. The dummy wiring cell 60 has a first pin 61 and a second pin 62 as the above terminals. The first pin 61 and the second pin 62 correspond to both ends of the dummy wiring 50-J'.

Figure 10A:
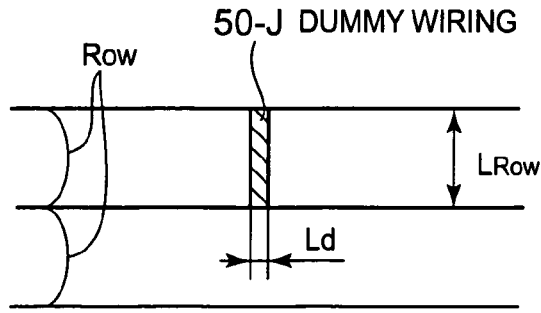
FIG. 10A is a diagram to explain the processing of Step S12 in FIG. 4, which is the layout data 7
Figure 10B:
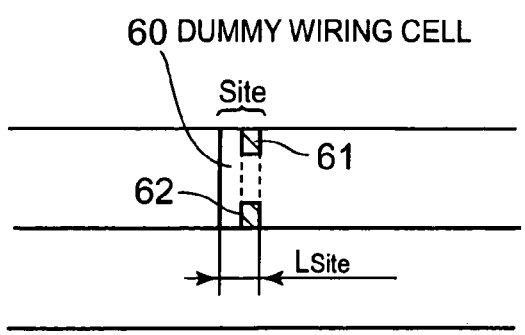
FIG. 10B is a diagram for explaining the processing of Step S12 in FIG. 4, which is the layout data 7.
Figure 22A:
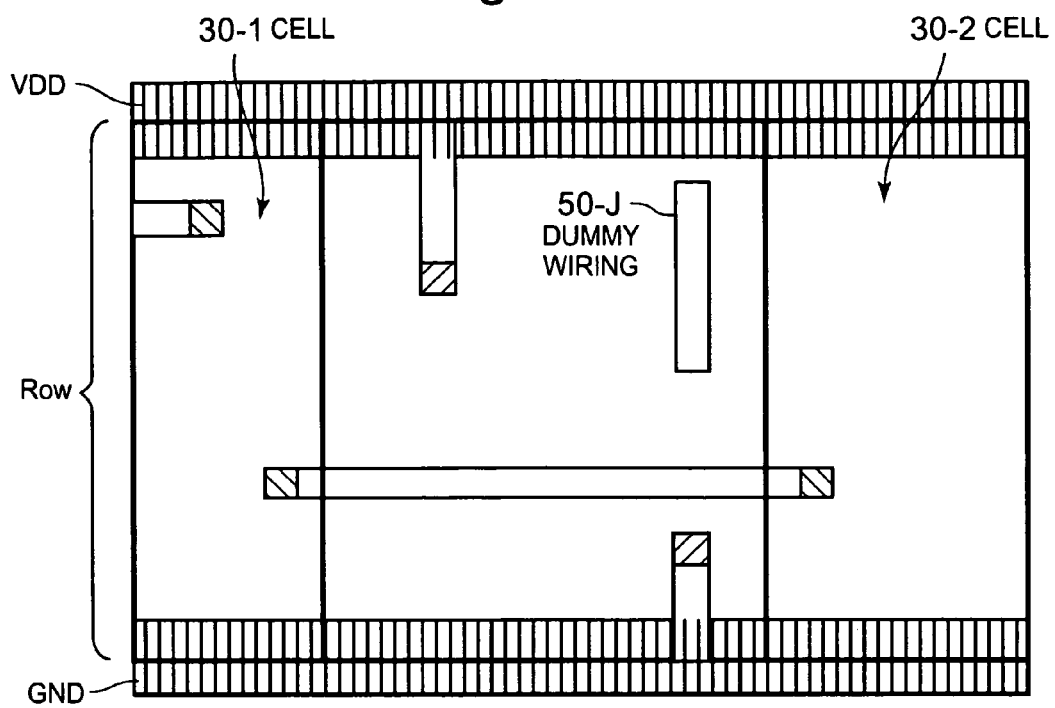
FIG. 22A is a layout diagram corresponding to FIG. 10A.
Figure 22B:
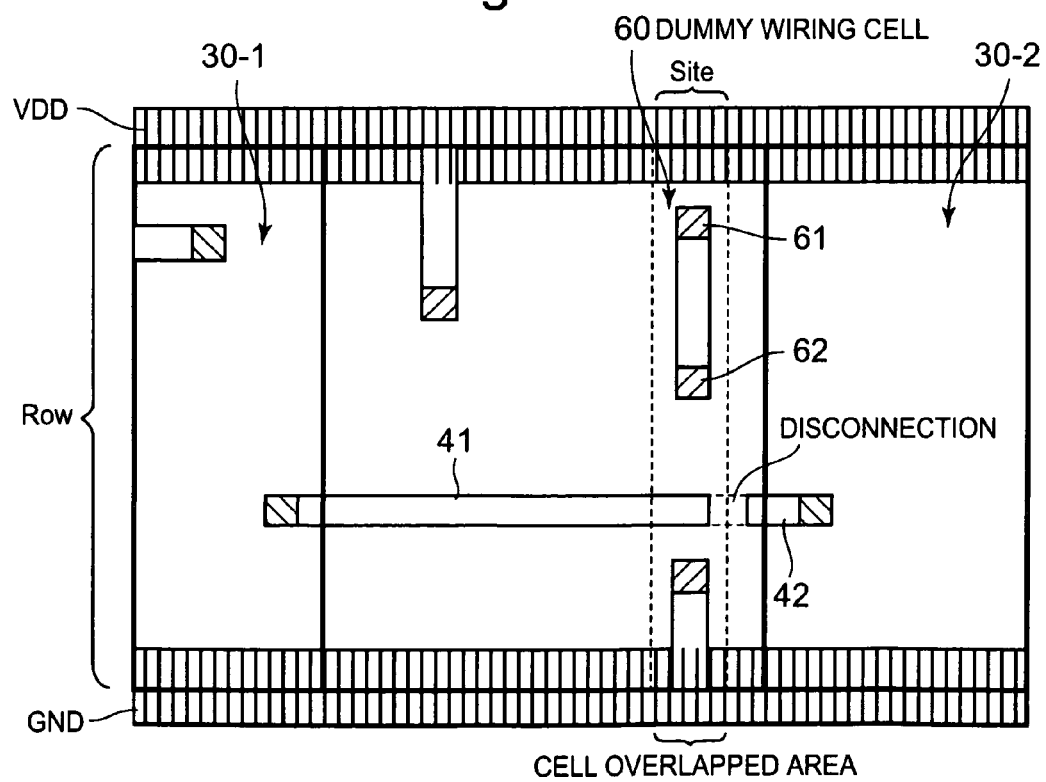
FIG. 22B is a layout diagram corresponding to FIG. 10B.

As shown in FIGS. 5 to 8, and 10A, the dummy wiring 50-J extends in parallel to the y-direction of the coordinates (X, Y) that are represented by the coordinate area 8. Also, as shown in FIG. 22A, each of the plural cells 30-1 to 30-M is placed between the first power supply VDD and the second power supply GND. With the above configuration, as shown in FIG. 10A, it is assumed that a length extending from one end of the dummy wiring 50-J to another end thereof is Ly, and a width of the dummy wiring 50-J is Ld. The width Ld is shorter than a length Lsite of Site. In this case, as shown in FIG. 10B, the dummy wiring connection processing unit 14 replaces the dummy wiring 50-J with the dummy wiring cell 60 whose configuration is determined as the length Ly and the length Lsite. For example, as shown in FIG. 22B, the dummy wiring cell 60 is placed between the first power supply VDD and the second power supply GND, and overlaps with a cell between the first cell 30-1 and the cell 30-2. The dummy wiring cell 60 has a first pin 61 and a second pin 62. The first pin 61 and the second pin 62 correspond to both ends of the dummy wiring 50-J.

A reason that the cell replacement processing is executed (Step S12) will be described.

Figure 11A:
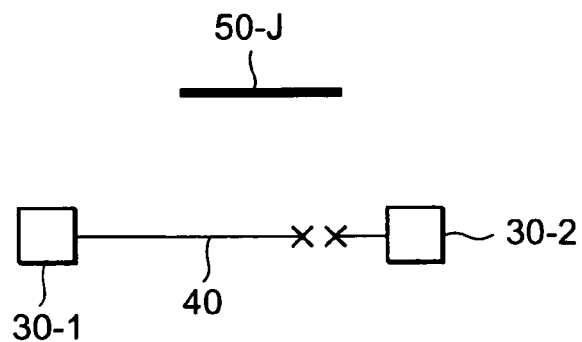
FIG. 11A is a diagram to explain a reason why the processing of Step S12 in FIG. 4 is executed and FIG. 11B is a diagram for explaining a reason why the processing of Step S12 in FIG. 4 is executed.
Figure 11B:
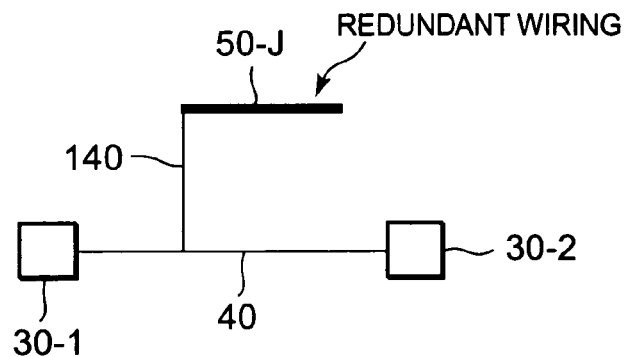

As normal, the wiring is connected between the cells. In this embodiment, for example, the target wiring 40 is connected between the first cell 30-1 and the second cell 30-2. However, when the dummy wiring 50-J is not replaced with the dummy wiring cell 60 as shown in FIG. 11A, for example, a modified wiring 140 that is connected between one of both ends of the dummy wiring 50-J and the target wiring 40 is generated to merely produce a redundant wiring, as shown in FIG. 11B. Under the circumstances, the dummy wiring connection processing unit 14 replaces the dummy wiring 50-J with the dummy wiring cell 60, thereby making it possible to connect between the first cell 30-1 and the dummy wiring cell 60 and connect between the dummy wiring cell 60 and the second cell 30-2 as will be described in Step S13 later.

Figure 12:
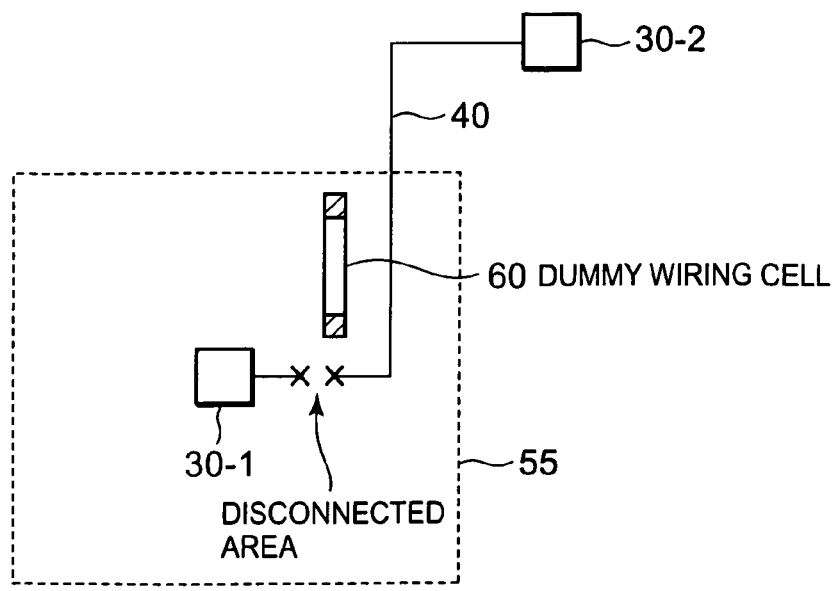
FIG. 12 is a diagram to explain the processing of Step S13 in FIG. 4, which is the layout data 7.

As shown in FIGS. 12, 21B, and 22B, the dummy wiring connection processing unit 14 cuts the target wiring 40 (Step S13) after executing the cell replacement processing (Step S12). In this case, the disconnection area spaces the disconnection width of two grids at a distance of one grid from an end of the target wiring 40. Also, when the target wiring 40 is cut, the first target wiring 41 and the second target wiring 42 whose one ends are connected to the first cell 30-1 and the second cell 30-2, respectively, are generated as shown in FIG. 13.

Figure 13:
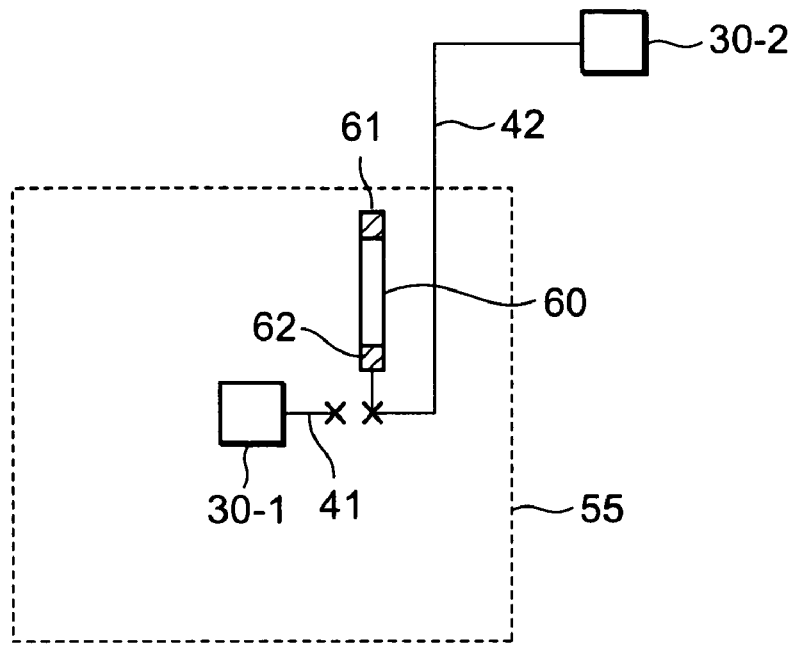
FIG. 13 is a diagram to explain the processing of Step S14 in FIG. 4, which is the layout data 7.
Figure 14:
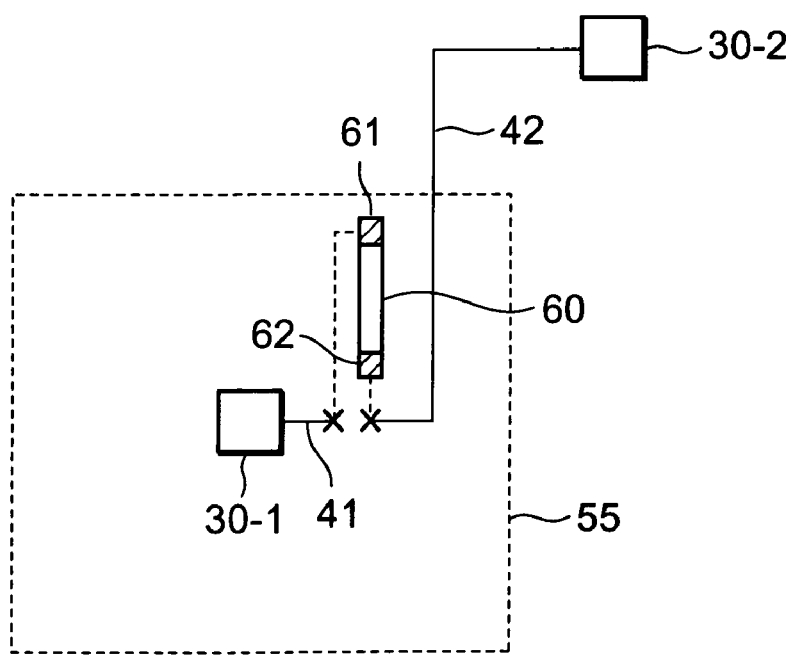
FIG. 14 is a diagram to explain the processing of Step S15 in FIG. 4, which is the layout data 7.
Figure 15:
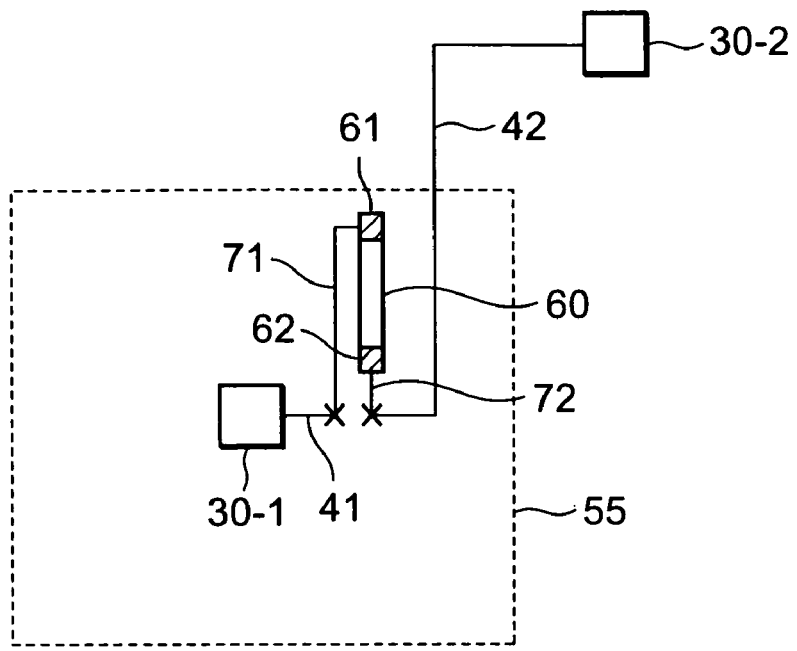
FIG. 15 is a diagram to explain the processing of Step S16 in FIG. 4, which is the layout data 7.
Figure 22C:
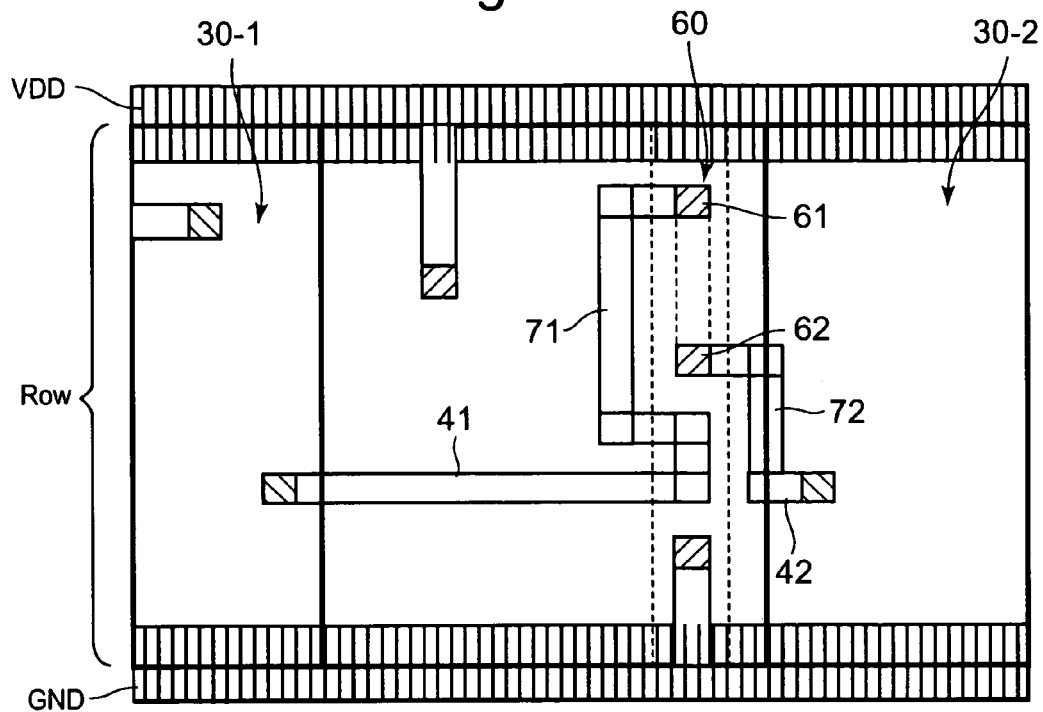
FIG. 22C is a layout diagram corresponding to FIGS. 12 to 16.

Then, as shown in FIG. 13, the dummy wiring connection processing unit 14 reflects another ends of the first target wiring 41 and the second target wiring 42, and the first pin 61 and the second pin 62 of the dummy wiring cell 60, respectively (Step S14). Then, as shown in FIG. 14, the dummy wiring connection processing 14 generates a first modified wiring that connects another end of the first target wiring 41 to the first pin 61 and a second modified wiring that connects another end of the second target wiring 42 to the second pin 62 as the global route. Then, as shown in FIGS. 15, 21C, and 22C, the dummy wiring connection processing 14 places the first modified wiring and the second modified wiring in the coordinate area 8 as a first modified wiring 71 and a second modified wiring 72, respectively (Step S16).

Figure 16:
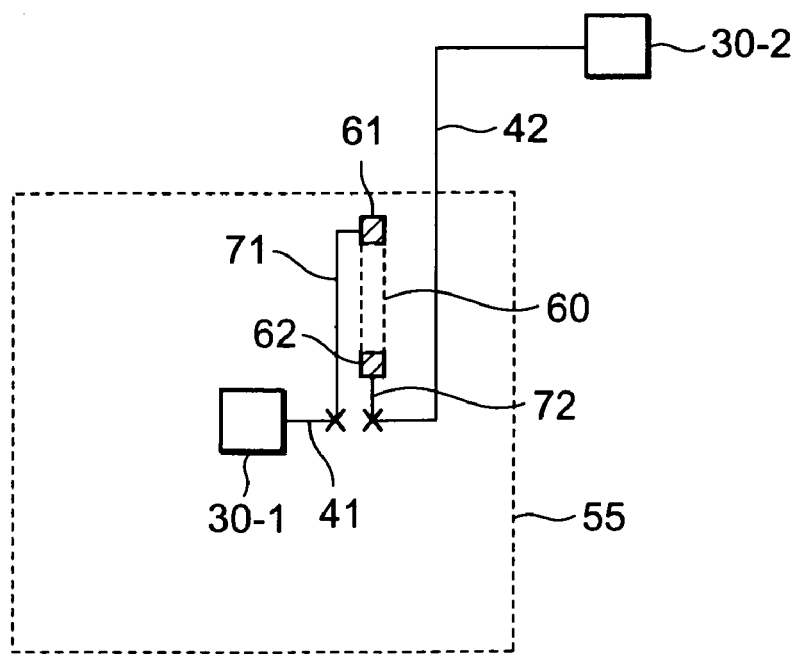
FIG. 16 is a diagram to explain the processing of Step S17 in FIG. 4, which is the layout data 7.
Figure 17:
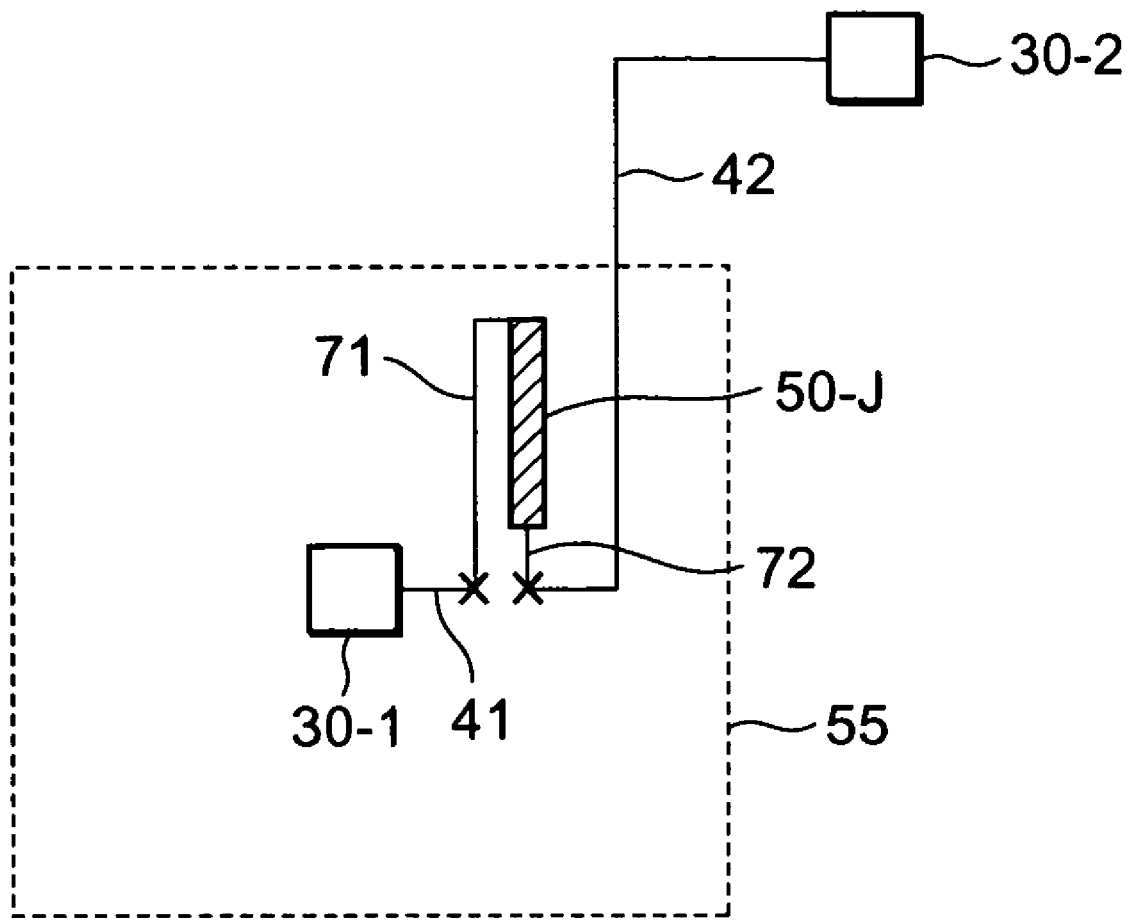
FIG. 17 is a diagram to explain the processing of Step S17 in FIG. 4, which is the layout data 7.
Figure 22D:
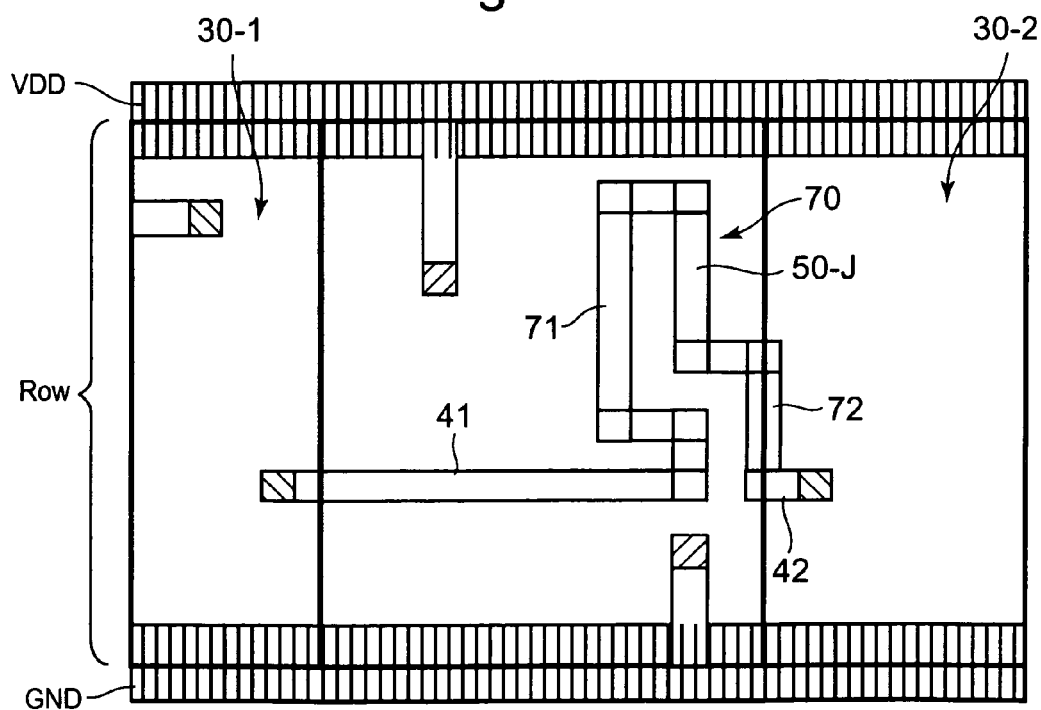
FIG. 22D is a layout diagram corresponding to FIG. 17.

Then, as shown in FIG. 16, the dummy wiring connection processing 14 remains the first pin 61 and the second pin 62 in the coordinate area 8, and deletes the dummy wiring cell 60 from the coordinate area 8. Then, as shown in FIGS. 17, 21D, and 22D, the dummy wiring connection processing 14 places the dummy wiring 50-J having the first pin 61 and the second pin 62 at both ends thereof in the coordinate area 8. In this way, the dummy wiring connection processing 14 replaces the dummy wiring cell 60 with the dummy wiring 50-J (Step S17). In this situation, as shown in FIGS. 17, 21D, and 22D, a wiring 70 to be modified including the first target wiring 41, the first modified wiring 71, the dummy wiring 50-J, the second modified wiring 72, and the second target wiring 42 is generated.

The dummy wiring connection processing 14 outputs the above layout data 7 to the output device 5 as the layout data 7' (Step S5) after execution of the dummy wiring connection processing (Step S4).

According to the above description, the effects of the automatic delay adjusting method for a semiconductor integrated circuit according to the first embodiment of the present invention will be described.

In the automatic delay adjusting method for a semiconductor integrated circuit according to the present invention, the dummy wiring 50-J is replaced with the above dummy wiring cell 60, the target wiring 40 is cut, and other ends of the first target wiring 41 and the second target wiring 42 are connected to the first pin 61 and the second pin 62 of the dummy wiring cell 60, respectively. Then, the dummy wiring cell 60 is replaced with the dummy wiring 50-J to generate the above wiring 70 to be modified. In this way, in the automatic delay adjusting method for a semiconductor integrated circuit according to the present invention, when the timing violation occurs for the target wiring 40, the dummy wiring 50-J can be automatically connected to the target wiring 40.

In the automatic delay adjusting method for a semiconductor integrated circuit according to the present invention, the dummy wiring 50-J is automatically connected to the target wiring 40, thereby making it possible to reduce the manpower and a time consumed by the manpower as compared with a case in which a process that connects the dummy wiring to the target wiring is manually operated. Accordingly, the automatic delay adjusting method for a semiconductor integrated circuit according to the present invention is excellent in the versatility as compared with the manual method.

Second Embodiment

In the first embodiment, the dummy wiring connection processing 14 connects one dummy wiring to the target wiring 40 as the dummy wiring 50-J. However, in the second embodiment, the dummy wiring connection processing 14 connects plural dummy wirings to the target wiring 40 until the timing violation does not occur for the target wiring 40. This will be described in the second embodiment, and the description to repeat of the first embodiment will be omitted.

Figure 18:
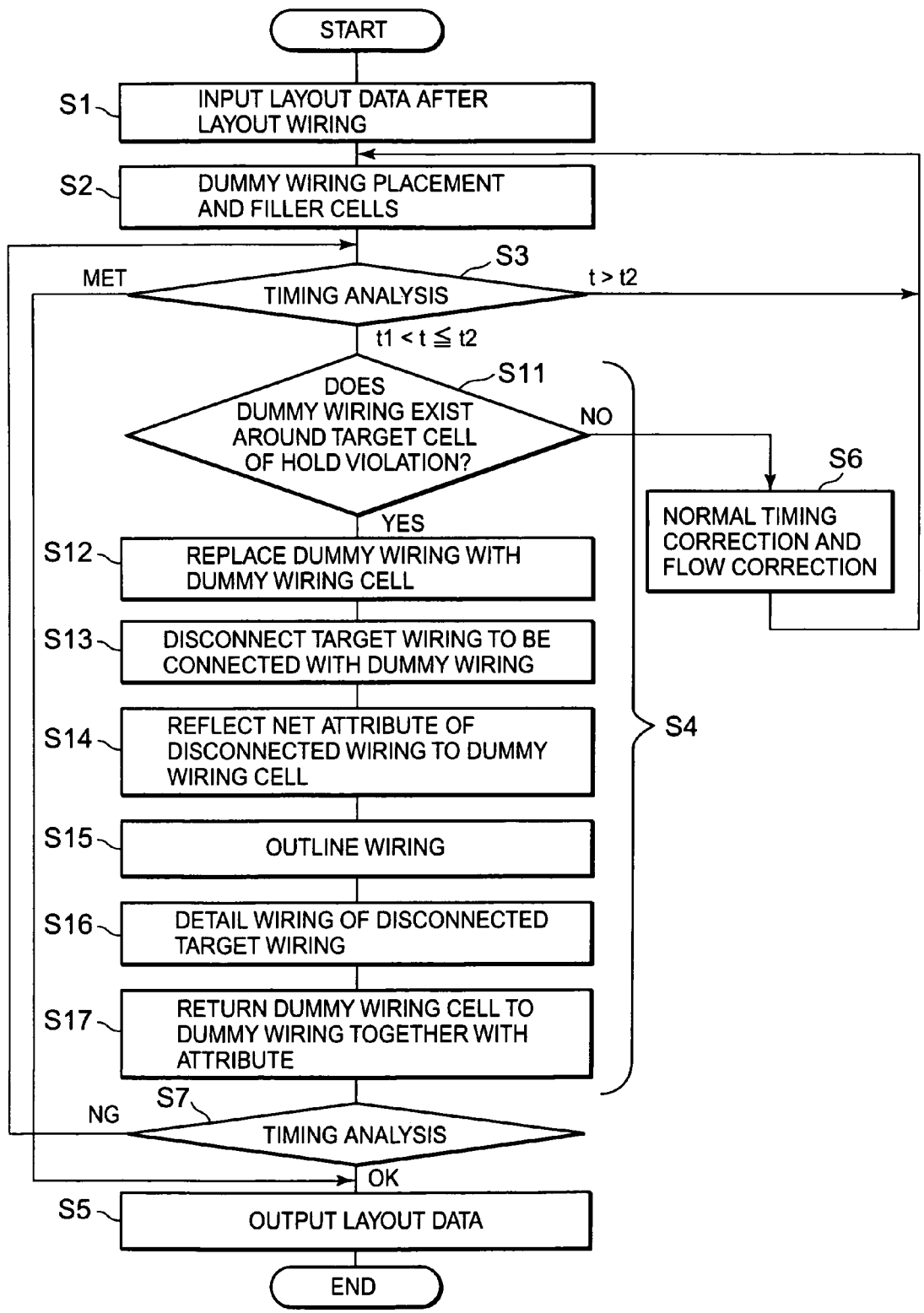
FIG. 18 is a flowchart showing the operation of a computer 1, which shows an automatic delay adjusting method for a semiconductor integrated circuit according to a second embodiment of the present invention.

FIG. 18 is a flowchart showing the operation of the computer 1, which shows an automatic delay adjusting method for a semiconductor integrated circuit according to the second embodiment of the present invention.

The above dummy wiring connection processing (Step S4) is executed. In this situation, the timing search processing unit 13 again executes a timing search processing (Step S3) with the wiring 70 to be modified as the target wiring 40.

Under the above circumstances, when the timing violation does not occur for each of the plural wirings (OK in Step S7), the timing search processing unit 13 outputs the above layout data 7 to the output device 5 as the layout data 7' (Step S5).

On the other hand, it is assumed that the timing violation occurs for the target wiring 40 (wiring to be modified 70) (NG in Step S7). As the timing violation (the above first timing violation), the delay time t of the target wiring 40 is longer than the first hold violation setting time t1 and equal to or shorter than the second hold violation setting time t2 ($t1 < t \leq t2$ in Step S3). In this case, the dummy wiring connection processing 14 again executes the above dummy wiring connection processing (Step S4).

Figure 19:
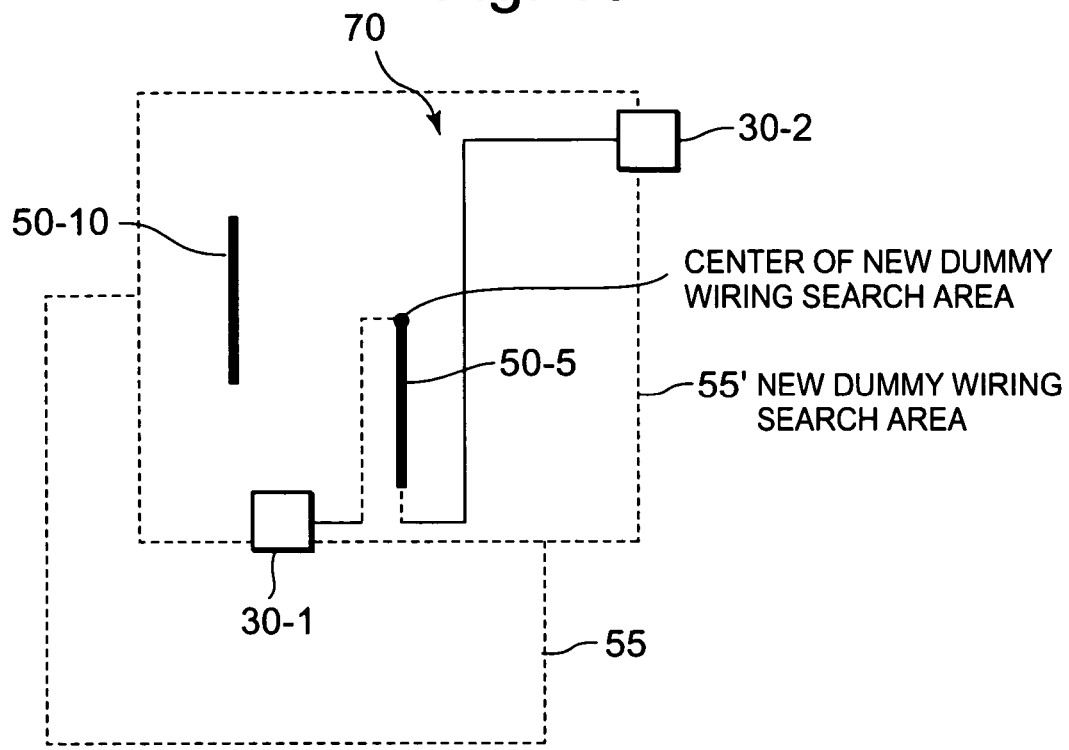
FIG. 19 is a diagram to explain the processing of Steps S1 to S7 in FIG. 18, which is the layout data 7.

As shown in FIG. 19, the dummy wiring connection processing 14 determines the dummy wiring search area 55' as the dummy wiring search area 55 including the dummy wiring 50-5, the first cell 30-1, and the second cell 30-2 around the coordinates of one end (● in FIG. 19) of both ends of the dummy wiring 50-5 as the above dummy wiring 50-J among the coordinates (X, Y) which is represented by the coordinate area 8. Also, when plural dummy wirings exist in the dummy wiring search area 55 as shown in FIG. 19, the dummy wiring connection processing unit 14 searches a dummy wiring 50-10 closest to one end of both ends of the dummy wiring 50-5 among the plural dummy wirings as a new timing adjustment dummy wiring. That is, the dummy wiring connection processing unit 14 searches the dummy wiring closest to the dummy wiring 50-5 as the adjustment dummy wiring 50-10 (YES in Step S11). Thereafter, a first modified wiring 73 and a second modified wiring 74 are newly generated by Steps S12 to S16, and a wiring to be modified 70 including the first target wiring 41, the first modified wirings 71, 73, the adjustment dummy wiring 50-10, the second modified wiring 74, the dummy wiring 50-5, the second modified wiring 72, and the second target wiring 42 is generated by Step S17 (refer to FIG. 20C).

Figure 20A:
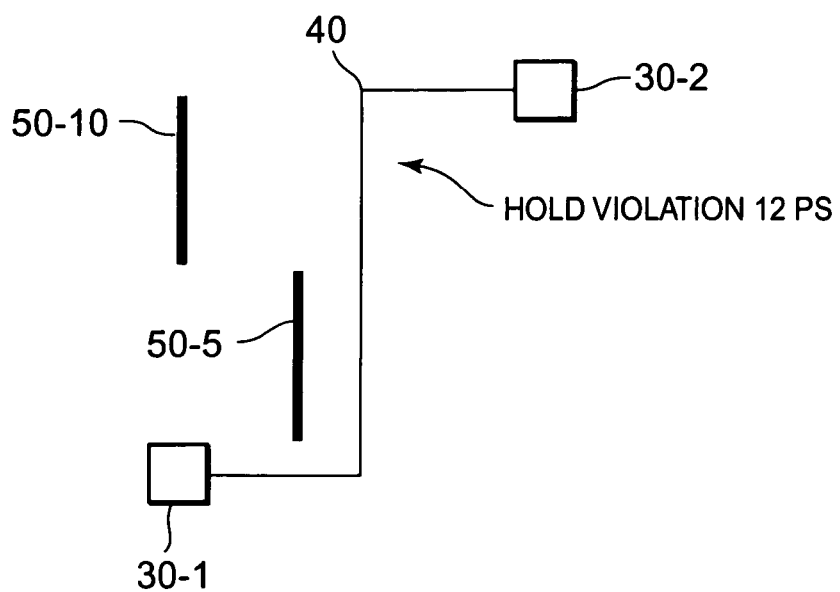
FIG. 20A is a diagram to explain the processing of Steps S1 to S7 in FIG. 18, which is the layout data 7.

It is assumed that a hold violation of 12 [ps] occurs due to the timing search processing (Step S3), and a dummy wiring is placed to the target wiring 40 as a specific example, as shown in FIG. 20A.

Figure 20B:
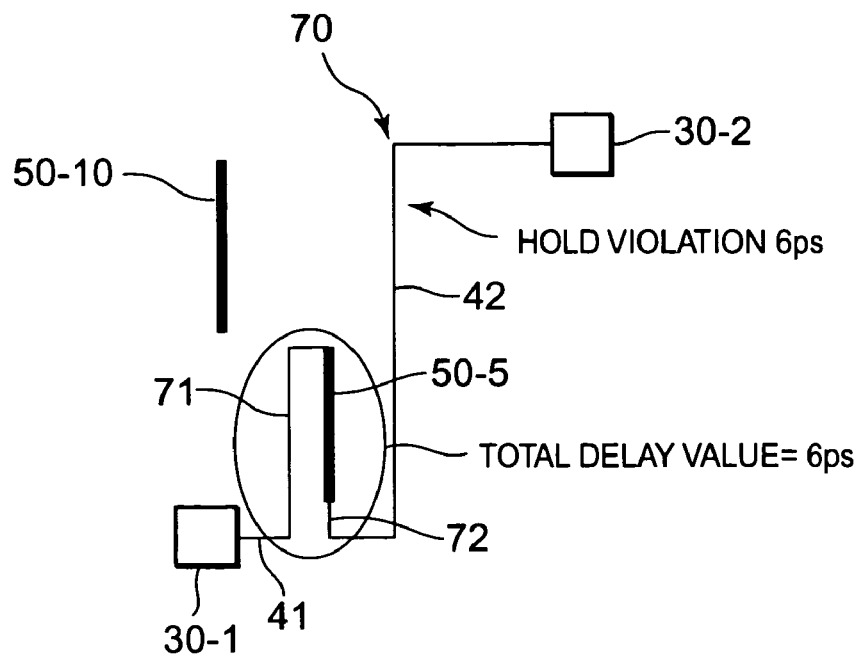
FIG. 20B is a diagram to explain the processing of Steps S1 to S7 in FIG. 18, which is the layout data 7

It is assumed that the respective delay times (delay values) of the plural dummy wirings 50-1 to 50-N are 1 [ps], the wiring length five times as long as the target wiring 40 is required to connect one dummy wiring to the target wiring 40. The design tool 6 is capable of readily calculating the delay value of the dummy wiring and the connection wiring by means of the placement information file 21 and the delay information file 22. In this case, the design tool 6 executes Steps S1 to S4 to provide the first modified wiring 71 and the second modified wiring 72 as the first connection wiring. The delay value of the first connection wiring becomes 1×5=5 [ps]. For that reason, as shown in FIG. 20B, the total delay value of the dummy wiring 30-5 and the first connection wiring becomes 1+5=6 [ps]. In this case, because the total delay value is less than 12 [ps] by 6 [ps], the design tool 6 determines that the addition of the dummy wiring is required.

Figure 20C:
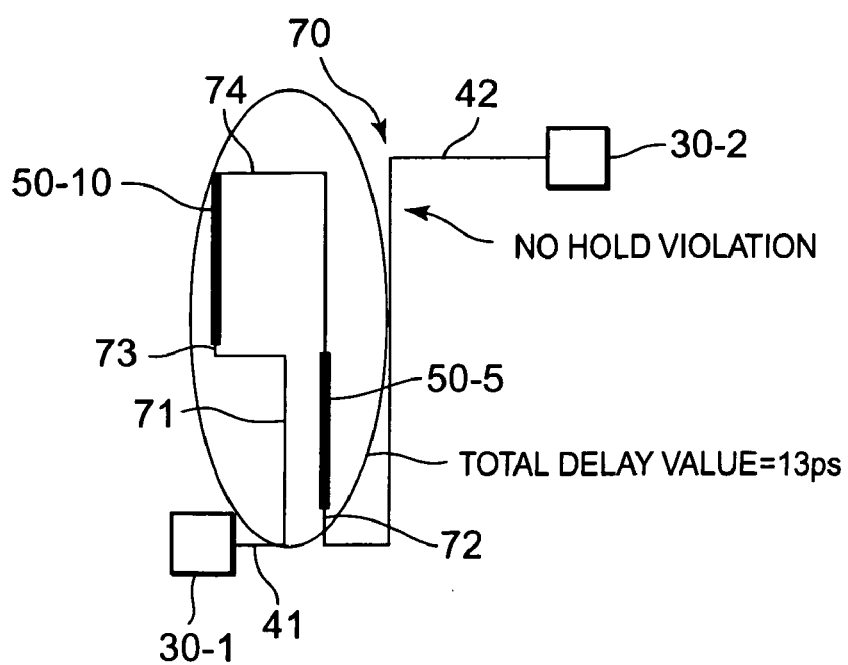
FIG. 20C is a diagram to explain the processing of Steps S1 to S7 in FIG. 18, which is the layout data 7.

It is assumed that the wiring length six times as long as the target wiring 40 is required to connect a second dummy wiring to the target wiring 40. In this case, the design tool 6 executes Steps S7, S3, and S4 to provide the first modified wiring 73 and the second modified wiring 74 as the second connection wiring. The delay value of the first connection wiring becomes 1×6=6 [ps]. For that reason, as shown in FIG. 20C, the total delay value of the dummy wiring 30-10 and the second connection wiring becomes 1+6=7 [ps]. When the total delay value of the dummy wiring 30-5 and the first connection wiring and the total delay value of the dummy wiring 30-10 and the second connection wiring are added together, 6+7=13 [ps] is satisfied. As a result, the total is larger than 12 [ps] of the hold violation, thereby making it possible to eliminate the hold violation.

In this situation, when the hold violation is not eliminated even if the second dummy wiring is connected, the design tool 6 executes Steps S7, S3, and S4, to thereby connect the third, fourth, and N-th dummies.

As described above, in the automatic delay adjusting method for a semiconductor integrated circuit according to the second embodiment of the present invention, plural dummy wirings can be automatically connected to the target wiring 40 (or the wiring to be modified 70) until the timing violation does not occur for the target wiring 40 (or the wiring to be modified 70). As a result, the automatic delay adjusting method for a semiconductor integrated circuit according to the present invention is further excellent in the versatility as compared with the manual method and the first embodiment.

Further, it is noted that Applicant's intent is to encompass equivalents of all claim elements, even if amended later during prosecution.

What is claimed is:

1. An automatic delay adjusting method of a semiconductor integrated circuit, said method comprising:
    placing a dummy wiring to a layout data, as executed by a processing unit on a computer; and
    connecting the dummy wiring to a target wiring which produces a timing violation, the target wiring being connected between first and second cells in the layout data,
    the dummy wiring connection comprising:
        replacing the dummy wiring with a dummy wiring cell having first and second pins respectively corresponding to first and second ends of the dummy wiring;
        cutting the target wiring to generate first and second target wirings;
        connecting the first and second target wirings to the first and second pins, respectively; and
        replacing the dummy wiring cell with the dummy wiring to provide a wiring that is connected between the first and second cells through the dummy wiring and the target wiring.

2. The automatic delay adjusting method according to claim 1, wherein said dummy wiring placing comprises:
    placing a plurality of dummy wirings in a coordinate area, and
    wherein said dummy wiring connection further comprises:
        searching the dummy wiring closest to the target wiring among the plurality of dummy wirings when the timing violation occurs for the target wiring.

3. The automatic delay adjusting method according to claim 1, wherein the layout data further includes a plurality of wirings, and
    wherein the method further comprises searching a target wiring for which the timing violation occurs among the plurality of wirings.

4. The automatic delay adjusting method according to claim 3, wherein the timing search further includes:
    calculating respective delay times of the plurality of wirings with reference to a delay information file that associates wiring lengths with delay times thereof;
    searching information whether a delay time is longer than first and second hold violation setting times, when a delay time of a hold violation occurs for the target wiring among the plurality of wirings, a second hold violation setting time being longer than a first hold violation setting time; and
    executing the dummy wiring connection when a delay time of the target wiring is longer than the first hold violation setting time and equal to or shorter than the second hold violation setting time as the timing violation.

5. The automatic delay adjusting method according to claim 4, further comprising:
    placing a hold buffer cell to repair hold for making the delay time longer than a delay time of the dummy wiring on the target wiring, to generate a wiring connected to the hold buffer cell, when the delay time of the target wiring exceeds the second hold violation setting time;
    again executing the timing search with the wiring connected to the hold buffer cell as the target wiring, when the wiring connected to a hold buffer cell is generated; and
    executing the dummy wiring connection when the delay time of the target wiring is longer than the first hold violation setting time, and equal to or shorter than the second hold violation setting time as the timing violation, when the timing search is again executed.

6. The automatic delay adjusting method according to claim 4, further comprising:
    again executing the timing search with the modified wiring as the target wiring, when the dummy wiring connection is executed; and
    again executing the dummy wiring connection when the delay time of the target wiring is longer than the first hold violation setting time, and equal to or shorter than the second hold violation setting time as the timing violation, when the timing search is again executed.

7. The automatic delay adjusting method according to claim 6, further comprising:
    again executing the timing search with the modified wiring as the target wiring, when the dummy wiring connection is executed; and
    outputting the layout data to an output device when the timing violation does not occur for the target wiring, when the timing search is again executed.

8. The automatic delay adjusting method according to claim 1, further comprising:
    outputting the layout data to an output device, when the dummy wiring connection is executed.

9. The automatic delay adjusting method according to claim 1, further comprising:
    connecting the first and second pins to the first and second target wirings, respectively.

10. The automatic delay adjusting method according to claim 1, wherein the first cell is connected through the target wiring and the dummy wiring to the second cell.

11. The automatic delay adjusting method according to claim 1, further comprising:

placing a hold buffer cell to repair hold for making a delay time longer than a delay time of the dummy wiring on the target wiring, to generate a wiring connected to the hold buffer cell, when a delay time of the target wiring exceeds a hold violation setting time.

12. A program product comprising a non-transitory computer readable medium storing a program to adjust a timing of a semiconductor integrated circuit, the program product comprising:

placing a dummy wiring to layout data; and connecting the dummy wiring to a target wiring which produces a timing violation, the target wiring being connected between first and second cells in the layout data, wherein the dummy wiring connection comprises:

replacing the dummy wiring with a dummy wiring cell having first and second pins respectively corresponding to first and second ends of the dummy wiring;

cutting the target wiring to generate first and second target wirings;

connecting the first and second target wirings to the first and second pins, respectively; and replacing the dummy wiring cell with the dummy wiring to provide a wiring that is connected between the first and second cells through the dummy wiring and the target wiring.

13. The program product according to claim 12, wherein the placing of the dummy wiring comprises placing a plurality of dummy wirings in a coordinate area, and wherein the dummy wiring connection further comprises searching the dummy wiring closest to the target wiring among the plurality of dummy wirings when the timing violation occurs for the target wiring.

14. The program product according to claim 12, wherein the layout data further comprises a plurality of wirings, and wherein the program makes a computer execute searching the target wiring for which the timing violation occurs among the plurality of wirings.

15. The program product according to claim 14, wherein the timing search further comprises:

calculating respective delay times of the plurality of wirings with reference to a delay information file that associates wiring lengths with delay times thereof; and searching information whether the delay time is longer than first and second hold violation setting times, when a delay time of the target wiring among the plurality of wirings for which a hold violation occurs, a second hold violation setting time being longer than a first hold violation setting time, wherein the program makes the computer execute the dummy wiring connection when the delay time of the target wiring is longer than the first hold violation setting time, and equal to or shorter than the second hold violation setting time as the timing violation.

16. The program product according to claim 15, wherein the program makes the computer further execute:

placing a hold buffer cell for making the delay time longer than the delay time of the dummy wiring on the target wiring, to generate a wiring connected to a hold buffer cell, when the delay time of the target wiring exceeds the second hold violation setting time;

again executing the timing search with the wiring connected to a hold buffer cell as the target wiring when the wiring connected to a hold buffer cell is generated; and executing the dummy wiring connection when the delay time of the target wiring is longer than the first hold violation setting time, and equal to or shorter than the second hold violation setting time as the timing violation, when the timing search is again executed.

17. The program product according to claim 12, wherein the program makes a computer execute outputting the layout data to an output device, when the dummy wiring connection is executed.

18. The program product according to claim 15, wherein the program makes the computer execute:

again executing the timing search with the modified wiring as the target wiring when the dummy wiring connection is executed; and again executing the dummy wiring connection when the delay time of the target wiring is longer than the first hold violation setting time, and equal to or shorter than the second hold violation setting time as the timing violation, when the timing search is again executed.

19. The program product according to claim 12, wherein the program makes the computer execute:

again executing the timing search with the modified wiring as the target wiring, when the dummy wiring connection is executed; and outputting the layout data to an output device when the timing violation does not occurs for the target wiring, when the timing search is again executed.

20. A computer in which the computer program product according to claim 12 is installed, said computer comprising:

a processor for executing the program to adjust the timing of the semiconductor integrated circuit.

* * * * *